Oct. 14, 1969   M. F. VIGNEROT   3,472,172
AUTOMATIC WATER LEVEL CONTROL
Filed Dec. 5, 1968   3 Sheets-Sheet 1

INVENTOR
MARCEL F. VIGNEROT
BY
Mann, Brown & McWilliams
ATTORNEYS

Oct. 14, 1969    M. F. VIGNEROT    3,472,172
AUTOMATIC WATER LEVEL CONTROL
Filed Dec. 5, 1968    3 Sheets-Sheet 2

INVENTOR
MARCEL F. VIGNEROT
BY
Mann, Brown & McWilliams
ATTORNEYS

Inventor
Marcel F. Vignoret
By Mann, Brown & McWilliams,
Attys.

United States Patent Office 3,472,172
Patented Oct. 14, 1969

3,472,172
AUTOMATIC WATER LEVEL CONTROL
Marcel F. Vignerot, 1910 Palmgren,
Glenview, Ill.
Continuation-in-part of abandoned application Ser. No. 669,145, Sept. 20, 1967. This application Dec. 5, 1968, Ser. No. 789,635
Int. Cl. F04f 5/48; F04b 49/04; F04d 15/00
U.S. Cl. 103—276
11 Claims

ABSTRACT OF THE DISCLOSURE

An automatic water level control which is responsive to determinable water level, and does not rely on any of the usual sources of motive power for operation. More specifically, the invention comprises a device which employs conventional city water as the motivating force to maintain a predetermined water level. City water is used as the drive fluid for an ejection pump, which ejection pump comprises two flat opposed plates and a float actuated valve for controlling drive fluid flow in response to said predetermined water level.

---

This application is a continuation-in-part of application Ser. No. 669,145, entitled "Automatic Water Level Control," filed Sept. 20, 1967, now abandoned.

The present invention relates to apparatus for automatic water level control having particular, although not exclusive, utility in the maintenance of water level in a sump well, often found in the basements of commercial and residential buildings, during power failures which disable more conventional electric or combustion engine pumps.

In areas where the water table demands precautions against seepage or floodings of any kinds into the lower levels of commercial and residential buildings, it has become prudent to provide a sump well for the collection of excessive water drainage. The top of the well sits at approximately floor level of the lowest level in the building being protected thereby, and a pump of conventional form is provided at the base of this sump well for periodic removal of water therein when it reaches a certain specified level—always below floor level. Such pumps are, in the usual case, driven by conventional electric motors, but in certain instances, gasoline engines and other less common modes of power may be employed.

Since primary pumps of this type are dependent solely upon the mode of power employed to drive them, when that power source is, for any reason, interrupted, the pump is rendered inoperative. It is not uncommon for electrical power to be interrupted by a heavy rain storm, and, therefore, the interruption of electrical power may well be accompanied by a temporary flooding condition. Accordingly, the owner of such a building is not only faced with a power failure, but no means of ridding himself of the usual quantities of water which may accompany such a failure.

It is an object of the present invention to provide an improved water level control device which functions automatically in response to a predetermined maximum water level, and which is wholly independent of conventional power sources such as electricity for its operation, thereby rendering the same effective as a secondary or emergency arrangement for maintaining proper water level under almost any adverse condition.

It is another object to provide a water level control of the type herein characterized which involves a single moving part, and is readily installed for operation, and once installed, virtually maintenance-free.

These and other objects and advantages of the invention will appear from the following detailed description of a preferred embodiment thereof taken in conjunction with the drawings wherein.

Figure 1:
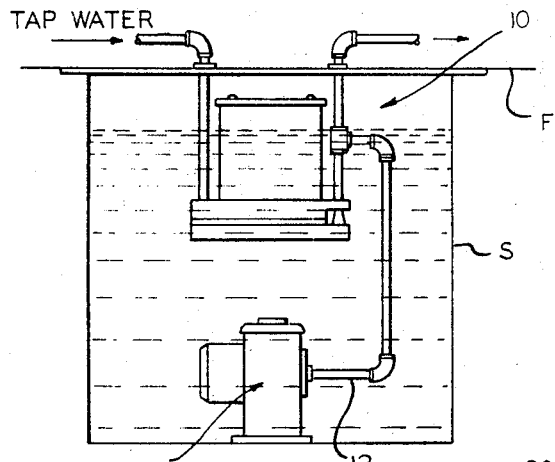
FIGURE 1 is a pictorial representation of a typical sump well installation illustrating a water level control device constructed in accordance with the invention mounted as a secondary unit.

While the invention is susceptible of various modifications and alternative constructions, a particular illustrative embodiment is shown in the drawing and will be described hereinafter in detail. It will be understood that the described embodiment is for the purpose of exemplifying the invention, and does not represent the sole limits thereof. It is the intention to cover all modifications, equivalents and alternative constructions falling within the spirit and scope of the invention as expressed in the appended claims.

Specifically referring now to the drawings, and initially to FIGURE 1, a water level control device constructed in accordance with the invention, is indicated generally at 10. The unit is shown environmentally as it would be employed in an auxiliary or secondary water level control in a sump well S, although use as a primary pump or in other auxiliary fashions is contemplated.

A sump pump P is schematically illustrated, and intended to be representative of the many types of available sump pumps which reside in the base of the sump well S. The pump, for purposes of this description, will be considered as being electrically operated, and employs a rotating impeller to drive water from the sump through a discharge line 12 to a repository such as a storm sewer (not shown) or other place outside the confines of the area to be protected.

In the illustrated case, the controller unit 10 is employed as an auxiliary pump for the maintenance of a specified water level at some convenient distance below the basement floor F. It is a feature of the control device 10 that it is independent of the usual mode of power sources such as electricity, and, therefore, is operative and continually on guard against excessive water levels under practically all circumstances. More particularly, the control device 10 employs, as its source of motive power, water pressure developed through the usual incoming water lines to the building in which the device is employed. Since water pressure is usually a function of the static head developed at a storage tower, and the water flows gravitationally, water pressure is usually unaffected by power failures. Thus, the device 10 is rendered operative by simply connecting the pump to a source of water under pressure, such as the incoming water line, or to a faucet or like installation.

Figure 2:
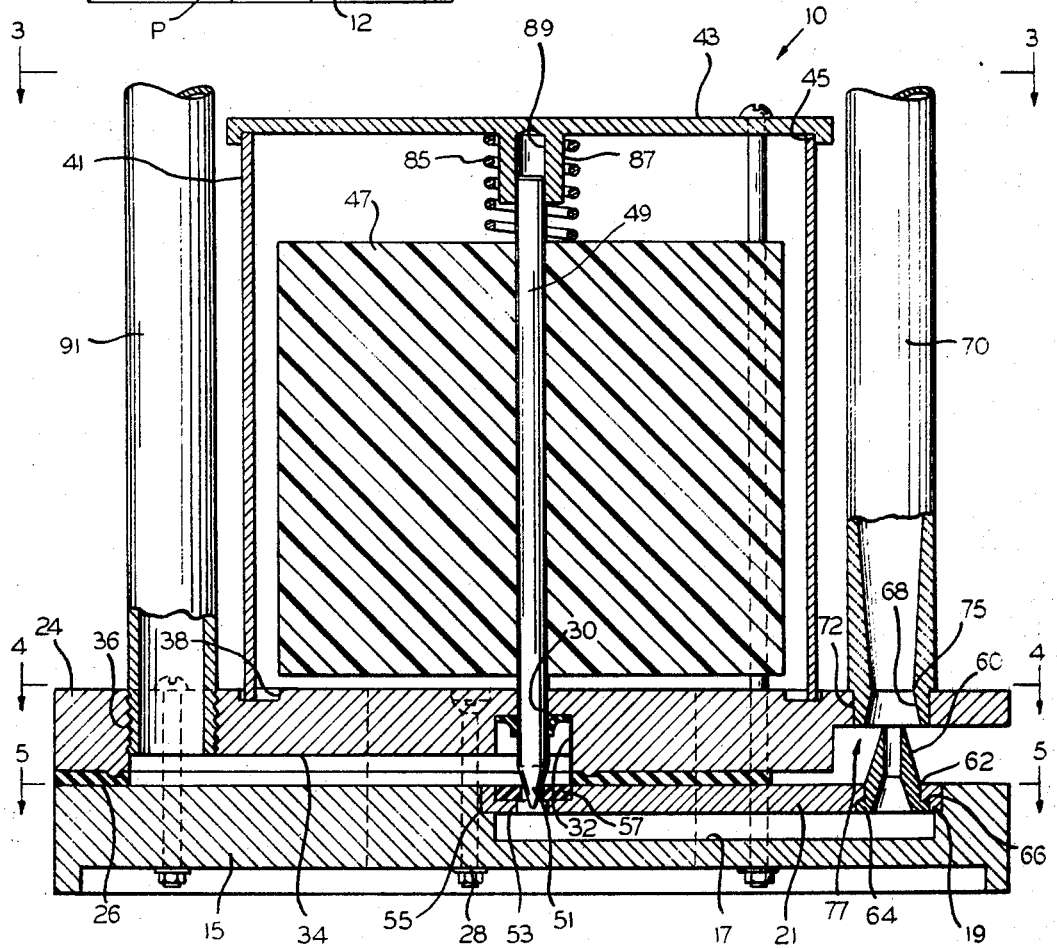
FIGURE 2 is a fragmented, partially sectioned side elevation of a water level control device constructed in accordance with the present invention.
Figure 3:
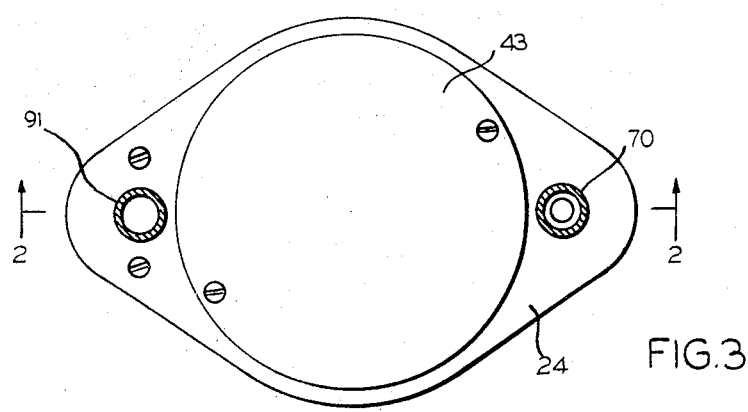
FIGURE 3 is a plan view of the device of FIGURE 2, and further illustrating at lines 2—2, the location at which the unit was sectioned to illustrate FIGURE 2.

Referring specifically now to FIGURE 2, the water level control unit of the present invention comprises a minimum of parts, all of which are readily fabricated and assembled, and only one of which may be fairly considered a moving part. Since even the moving part results in negligible frictional wear, the construction is virtually maintenance-free. This high reliability factor permits the pump to be installed permanently in relatively inaccessible places without concern for the need to remove and service the same.

Figure 5:
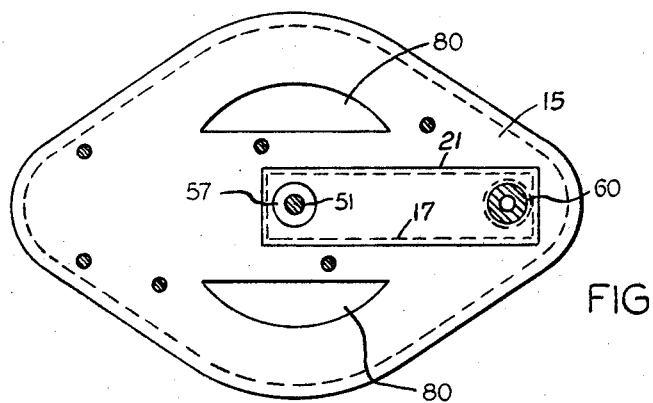
FIGURE 5 is still another view similar to FIGURES 3 and 4 taken along lines 5—5 of FIGURE 2.

Turning to the specific elements which comprises the control unit 10, there is a sole or base plate 15 which, as will be seen in referring to FIGURE 5, is of a modified diamond shape, having a centrally disposed circular area flanked by smoothly rounded ear portions or flanges. It will be appreciated that the specific shape of the device may be varied without departure from the invention.

The sole plate 15 is cast, or otherwise machined to provide a channel 17 extending from the approximate center thereof, toward one of the elongated ears. The channel is provided with a peripheral shoulder 19, and a cover plate 21 is fitted over the channel, and nested on the shoulder to provide a metal to metal seal.

Disposed above the base plate 15 is an upper body member or cover plate 24. The sole plate and cover plate are separated by a combination spacer and sealing gasket 26 which may be formed of rubber or other suitable sealing material, and the two are joined in any known manner such as by screws 28.

The cover plate 24 is formed with a central aperture 30 which is countersunk at 32. Not unlike the sole plate, a channel 34 is cast or otherwise formed in the cover plate. The channel 34 encompasses the opening formed by the countersink 32 and extends toward one edge of the cover plate where it encompasses an inlet port 36 comprising a threaded port extending through the plate, in the illustrated case, at right angles to the plane thereof.

In order to support a housing for a water level sensing apparatus, a groove 38 is formed on the outer face of the cover plate, and a canister comprising a cylindrical member 41 is seated in the groove 38. The canister 31 is provided with a cap 43 which has a shoulder 45 thereon to provide good sealing contact with the canister walls.

Within the canister, water level sensing apparatus comprising a float member 47 formed of styrofoam, or some other suitable bouyant material, is provided and is adapted to operate a needle valve arrangement. Thus, the float 47 is directly connected to the stem 49 of a needle valve assembly. The stem extends through the central opening 30 in the cover plate and the end 51 thereof is tapered to form a conic section. The plate 21 is formed with a hole 53 having a countersunk portion 55 into which a valve seat member 57 is secured. The valve seat may be constructed of Teflon, rubber or other suitable sealing material, and the tapered end of the needle valve seats against the same to selectively seal the channel 17 from the channel 34 formed between the cover and sole plates as a consequence of the assembly of the two in the manner previously described. By using any one of the low friction deformable seat materials a minimum of wear is experienced, thus enhancing reliability.

The channel 17 is, in accordance with the invention, in direct communication with a nozzle member 60 which, in the illustrated case, is adapted to fit into an aperture 62 at an end of the plate 21 remote from the valve seat aperture. The nozzle member is formed with a shoulder 64 which abuts a complementary shoulder 66 formed as part of the aperture 62, and my be press-fitted or otherwise secured to the plate 21 prior to final assembly of the device. The nozzle 60 is constructed to direct its effluent towards the open mouth 68 of a discharge pipe 70 which is fitted in an aperture 72 in the cover plate 24. The discharge pipe 70 is, in keeping with this aspect of the invention, provided with a narrowed throat 75 defining a Venturi which is adapted to bring about a reduced pressure high velocity flow condition at that point in the pipe.

As will be seen in FIGURE 2, a portion of the inner face of the cover plate about the pipe 70 is removed to provide a substantial area of fluid communication with the sump. Accordingly, sump water is, at all times, when the device is rendered operative, wholly within the area indicated generally at 77 between the nozzle and the mouth 68 of the pipe 70.

Figure 4:
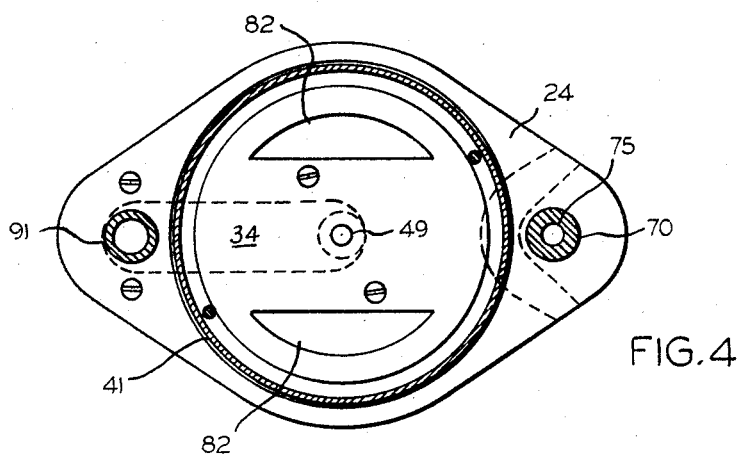
FIGURE 4 is a view similar to FIGURE 3, taken along lines 4—4 of FIGURE 2.

With reference now particularly to FIGURES 4 and 5, in order that the float 47 may be rendered responsive to the water level in the sump, rather substantial openings 80 are formed in the sole plate 15, and are aligned with complementary openings 82 in the cover plate. These openings communicate directly with the inside of the canister, and cause the float 47 to reciprocate within the space allowed, thereby rendering the needle valve responsive to water level. In order to provide the desired response, the float is, in accordance with the invention, preloaded by a spring 85 which, in the illustrated case, is mounted about a retainer hub 87 formed on the inner face of the cap 43 on the canister. The hub is bored out at 89 so as to provide an alignment guide for the stem 49 of the needle valve which protrudes through the top of the float. By maintaining alignment both at the remote end, and at the aperture 30, minimum wear is experienced and the device as previously stated, remains virtually maintenance-free.

As will now be apparent, input water is connected to the port 36 by means of any suitable connection 91. As will be appreciated, this may comprise flexible hose which is connectable to a facuet, or may involve a permanent plumbing installation directly to the water line coming into the building. Placement of the level controller 10 within the sump will determine the permissible water level. As the water rises, it will pass through the openings 80 and 82, respectively, and into the canister, causing a buoyant pressure on the float 47. When this pressure overcomes the bias of the spring 85, the stem 49 will be caused to raise, thus opening the needle valve, and exposing port 53 to water pressure in the channel 34. The water under pressure rushes through channel 17 and is ejected through the nozzle 60 at relatively high velocities and lower pressures. The pressure of the sump water at the nozzle opening, being greater than the pressure of the water effluent from the nozzle, will tend to rise at the mouth 68 of the discharge pipe 70. The Venturi in the discharge pipe will bring about a further reduction in pressure, with a resultant aspiration of sump water through the discharge pipe. As the water level recedes, the float will, of course, be urged downwardly by the bias of the spring 85, and will eventually close the valve, thereby shutting off the primary water source under pressure and the aspirating action will stop.

Figure 6:
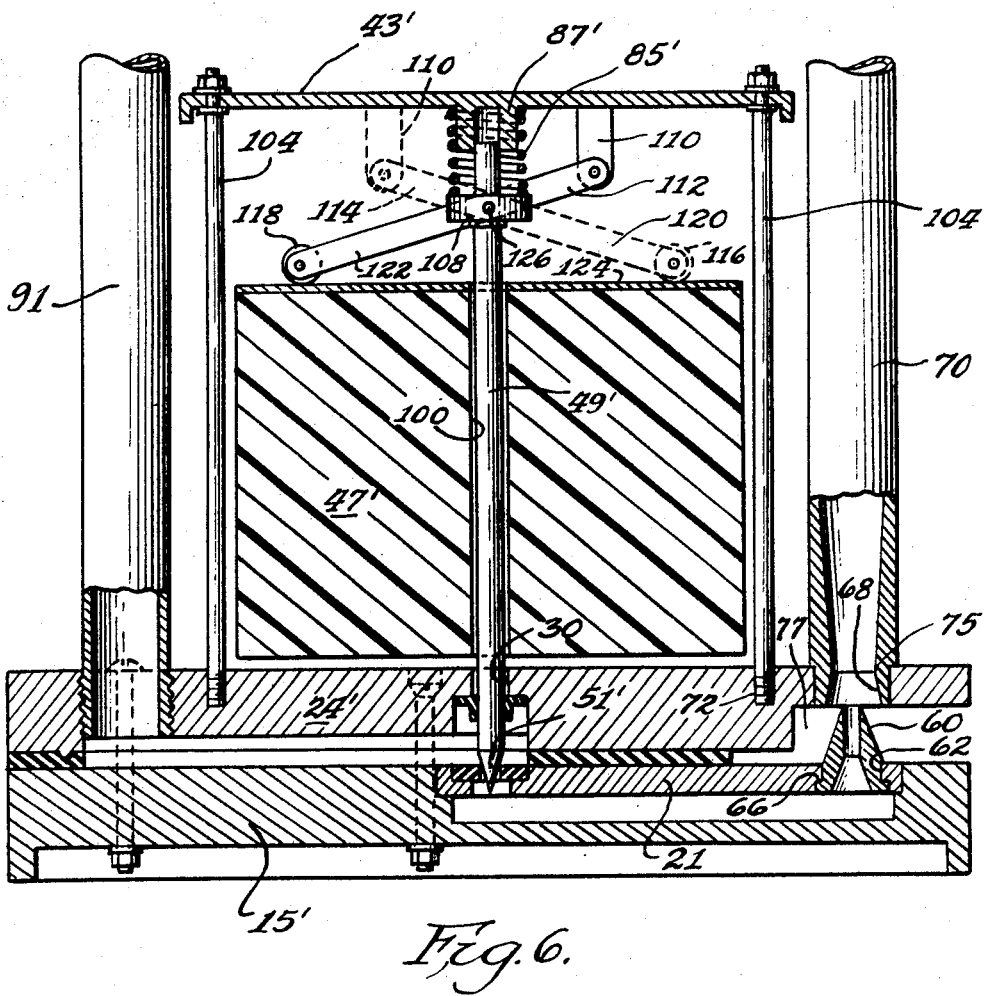
FIGURE 6 is a fragmented, vertical, partially sectional view of a modified water level control device.

Referring now to FIGURE 6, there is represented a modified form of water level control device in which the float is not fastened directly to the valve stem. By virtue of the lever arrangement between the float and the valve stem, a mechanical advantage is obtained whereby a lesser water pressure or a lower level of water will cause the valve to open; or the levering can be such that a wider opening of the valve can be obtained with a smaller rise in water level.

In the modification shown in FIGURE 6 the float 47' made of Styrofoam or other suitable buoyant material, is mounted to slide upwardly and downwardly on stem 49'. The float has a central passageway 100 of slightly greater diameter than the valve stem so that the float can easily move up and down. Valve stem 49' with valve closure end 51' tapered at an angle of about 50 to 55° from the horizontal, is adapted to reciprocate in passageway 100. By tapering the valve closure end to about 50 to 55°, the water pressure assists in opening the valve. A plate or cap 43' is mounted above the float 47 by means of two or more tie rods 104. The lower ends of the tie rods 104 are threaded into or otherwise fastened to plate 24'. The upper end of the valve stem 49' is guided in retainer hub 87'. Mounted on stem 49' between the float and hub 87' is a collar or block 108. The collar may be circular or may have straight sides, such as in the form of a square or hexagonal nut. Mounted on the under surface of plate 43' are brackets 110 to which are pivoted levers 112 and 114. I prefer to use two identical levers extending in opposite directions in order to obtain balanced operation between the float and valve stem. The opposite ends of the levers 112 and 114 are adapted to ride on the upper surface of the float 47'. Rollers 116 and 118 may be mounted on the ends 120 and 122 respectively of the lever ends with the upper surface of the float. A thin aluminum or other metal plate 124 with a central opening to accommodate stem 49' is preferably mounted on the upper surface of the float 47' in order to provide a wear surface on which the ends of the levers move. The plate 124 may be cemented to the upper surface of the float 47' by suitable adhesive or may be allowed to lie loose on the upper surface. Instead of a plate, metal channels may be provided in which the ends of the lever arms move back and forth.

Equal length lever arms 112 and 114 are pivoted at an intermediate point by means of pivots 126 to the stem 49'. Pivots 126 preferably are bushings with threaded ends adapted to be screwed into tapped holes in the block or collar 108. The collar may be held in place on the valve stem by a pin driven through matching openings in the collar and stem.

I prefer to place the intermediate pivot point on the arms at a position such that the ratio of the arm between stationary pivot 110 and moving pivot 126 is approximately ½ to ⅓ the length of the arm between pivot 126 and the rollers. As a result of the ratio of the lever arms, a mechanical advantage is obtained whereby the float exerts a greater lifting power on the stem and is thereby able to move the stem upwardly at a lower water level but at a slower rate than the rate at which the float moves upwardly.

Spring 85' is retained between retainer 87' and 128 block 108 to bias the valve to closed position in the same manner as set forth in connection with the modification shown in FIGURE 2. By using the lever arrangement with power multiplication a stronger biasing spring can be used to hold the valve in tightly closed position and prevent leakage when the device is not in operation.

It will be obvious that if it is desired to provide for wider opening of the valve stem upon small upward movement of the float, the ratio of the two arms on the lever can be reversed so that the shorter arm is the arm between the roller end and the pivot point on the stem.

In view of the fact that the float moves at a different rate from that of the stem it is necessary to provide a loose connection between the float and the stem so that the float does not bind on the stem during relative movement of the two. This is accomplished by the loose fitting of the float on the stem and by the pivoted arms with free ends that can move over the surface of the stem and the float during relative movement between the stem and the float.

The structure of FIGURE 6 provides a device which permits the use of a stronger biasing spring 85' to hold the valve in tightly closed position and prevent leakage, and at the same time provides a system which enables the water level through the mechanical advantage obtained from the levers to have the necessary pressure to open the valve at the desired time.

The device shown in FIGURE 6 is shown without a canister enclosing the float. It will be apparent that if the float is exposed to the sump water, it will not be necessary to have access openings 80 and 82 in plates 15' and 24'. However, the modification shown in FIGURE 6 may be equipped with a canister in the same manner as shown in connection with FIGURE 2 in which case plate 24' would be formed with groove 38, both plates 15' and 24' would have access openings, and plate 43' could be supported on the canister without the use of tie-rods. Similarly the modification shown in FIGURE 2 can be used without the canister 41 by supplying appropriate support for cap 43, similar to that used in FIGURE 6.

It has been found that most communities maintain working pressures of 30 to 60 pounds static head in their incoming water supplies. Apparatus constructed in accordance with the present invention wherein the Venturi restriction 75 is 9/16 inch, are operative under a head as low as 20 pounds per square inch and are capable of pumping as much as 650 gallons per hour net and with a motive ratio of 2.435 to one. This is based upon the experimental action of the pump which discharged 10 gallons of sump water for every 2.90 gallons of motive or primary water.

It will be appreciated that the pump of the present invention may be used both as a primary or secondary water level control, and is operative wherever a source of primary water under pressure is available. Furthermore, it is capable of handling small solids as well as fluids, thus making it ideal in sump applications.

I claim as my invention:

1. A water level control device comprising, in combination, a pair of plate members joined in face to face relation, distinct channels defined in the opposed faces of said plate members, and an aperture disposed in a position to provide communication therebetween, a valve seat in said aperture, a valve member comprising an elongated stem having an end normally biased into closed position against said seat whereby to close off communication between said channels, a guideway in one of said plates for said stem, a housing mounted on one of said plates about said protruding stem, openings communicating with the interior of said housing, a float secured to the portion of said stem within said housing, said float being reciprocable in said housing in response to water level in said housing in a direction to move said valve to open position, one of said channels being connected to a source of fluid under pressure, another of said channels being connected to a nozzle defining an outlet opening, conduit means secured to one of said plates, said conduit means having an open end and a narrowed throat near said end, said nozzle being spaced from and directed toward the open end of said conduit means, so that opening of the aperture between said channels in response to movement of said float causes fluid to be ejected from said nozzle toward said conduit means.

2. The apparatus as set forth in claim 1 wherein one of said plates in provided with a circular groove about said stem protruding therethrough, a canister seated in said groove, a cap disposed on said canister defining therewith said housing, sand cap having a boss thereon and means defining a guide in said boss for receiving an end of said stem.

3. The apparatus as set forth in claim 1 wherein said openings are aligned openings formed in said plate members providing communication between said housing and fluid outside the confines of said device.

4. The apparatus as set forth in claim 1 wherein said valve seat comprises a deformable member secured in the aperture between said channels.

5. The apparatus as set forth in claim 1 wherein one of said plate members is formed with a cut-away portion about the end of said conduit means so as to provide an open area between said nozzle and said conduit means opening.

6. A water level control device comprising in combination a pair of plate members joined in face to face relation, distinct channels defined in the opposed faces of said plate members, and an aperture disposed in a position to provide communication therebetween, a valve seat in said aperture, a valve member comprising an elongated stem having an end normally biased into closed position against said seat whereby to close off communication between said channels, a guideway in one of said plates for said stem, a float secured to said stem, said float and stem being reciprocable in response to water level surrounding said device, in a direction to move said valve to open position, one of said channels being connected to a source of fluid under pressure, another of said channels being connected to a nozzle defining an outlet opening, conduit means having an open end and a narrowed throat near said end, said nozzle being spaced from and directed toward the open end of said conduit means, so that opening of the aperture between said channels in response to movement of said float causes fluid to be ejected from said nozzle toward said conduit means.

7. A water level control device comprising in combination a pair of plate members joined in face to face relation, distinct channels defined in the opposed faces of said plate members, an aperture disposed in a position to provide communication between said channels, a valve seat in said aperture, an elongated stem with a valve closure member at one end thereof, said valve closure member cooperating with said valve seat to open and close said aperture, means supporting said stem to permit reciprocable movement in directions to effect valve opening and closure, spring means biasing said stem toward valve closure posititon, a float, operable means for moving said stem in valve-opening direction upon movement of the float in the same direction, one of said channels being connected to a source of liquid under pressure, another of said channels being connected to a nozzle defining an outlet opening, conduit means having an open end and narrowed throat near said nozzle, said nozzle being spaced from and directed toward the open end of said conduit means, so that opening of the aperture between said channels in response to movement of said float causes fluid to be ejected from said nozzle toward said conduit means.

8. A water level control device in accordance with claim 7 in which the operable means for moving the stem in valve-opening direction comprises a lever, one end of which is pivotally mounted on a stationary point above said float, the other end is free to ride on the upper surface of said float and the lever is pivotally fastened to said stem at an intermediate point of the lever such that there are two lever arms of different lengths.

9. A water level control device in accordance with claim 8 in which there are two such substantially identical levers pivotally fastened at an intermediate point to the stem by the same pivotal means, and said two levers are mounted in diametrically opposite directions.

10. A water level control device in accordance with claim 8 in which the arm of the lever between the fixed pivot and intermediate point of the lever is of shorter length then the other arm.

11. A water level control device in accordance with claim 8 wherein the ratio of the arm between the fixed pivot and intermediate point of the lever and the other arm of the lever is about one-half to one-third.

References Cited
UNITED STATES PATENTS

| 519,618 | 5/1894 | Power | 103—276 |
| 573,014 | 12/1896 | Lee | 103—276 |
| 714,682 | 12/1902 | Erwin | 103—276 X |
| 719,740 | 2/1903 | Burke | 103—276 |
| 853,850 | 5/1907 | Woodall | 103—276 |
| 972,441 | 10/1910 | Durdin | 103—276 X |
| 973,351 | 10/1910 | Hoffman | 103—276 X |
| 997,584 | 7/1911 | Rosenberg | 103—276 X |
| 1,063,468 | 6/1913 | Pribil | 103—276 |
| 1,177,270 | 3/1916 | Pursell | 103—276 |

DONLEY J. STOCKING, Primary Examiner

W. J. KRAUSS, Assistant Examiner

U.S. Cl. X.R.

103—14, 28